(12) United States Patent
Peddinti et al.

(10) Patent No.: US 9,582,537 B1
(45) Date of Patent: Feb. 28, 2017

(54) STRUCTURED SEARCH QUERY GENERATION AND USE IN A COMPUTER NETWORK ENVIRONMENT

(71) Applicant: Google Inc., Mountain View, CA (US)

(72) Inventors: Raghava Viswa Mani Kiran Peddinti, Sunnyvale, CA (US); Lakshmi Kumar Dabbiru, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 309 days.

(21) Appl. No.: 14/465,669

(22) Filed: Aug. 21, 2014

(51) Int. Cl.
*G06F 7/00* (2006.01)
*G06F 17/30* (2006.01)
*G06Q 30/02* (2012.01)

(52) U.S. Cl.
CPC .. *G06F 17/30424* (2013.01); *G06F 17/30241* (2013.01); *G06F 17/30389* (2013.01); *G06F 17/30595* (2013.01); *G06Q 30/0256* (2013.01)

(58) Field of Classification Search
CPC ............... G06Q 30/0256; G06F 17/30389
See application file for complete search history.

(56) References Cited

U.S. PATENT DOCUMENTS

| 8,990,105 | B1* | 3/2015 | Shatkin-Margolis | G06Q 30/02 705/14.25 |
| 2006/0064411 | A1* | 3/2006 | Gross | G06F 17/30864 |
| 2008/0162472 | A1* | 7/2008 | Cheng | G06F 3/16 |
| 2011/0078147 | A1* | 3/2011 | Klinkner | G06Q 30/02 707/740 |
| 2011/0295688 | A1* | 12/2011 | Shen | G06Q 30/0241 705/14.54 |
| 2014/0040246 | A1* | 2/2014 | Rubinstein | G06F 17/30554 707/722 |
| 2014/0172564 | A1* | 6/2014 | Alon | G06Q 50/01 705/14.54 |
| 2014/0195348 | A1* | 7/2014 | Sun | G06Q 30/0256 705/14.54 |

* cited by examiner

*Primary Examiner* — Charles Lu

(74) *Attorney, Agent, or Firm* — Foley & Lardner LLP; John D. Lanza; James De Vellis

(57) ABSTRACT

Systems and methods of evaluating search query terms in a computer network environment are provided. A data processing system can obtain, from a computing device via a computer network, a first search query and a second search query, and can determine a relationship between the first search query and the second search query. The data processing system can generate a structured search query representative of the first search query and the second search query, and can select, based on the structured search query, a content item for display by the computing device. The data processing system can receive an indication of a click on the content item, and can provide, to a content publisher computing device, a representation of the structured search query and the indication of the click on the content item.

20 Claims, 4 Drawing Sheets

US 9,582,537 B1

STRUCTURED SEARCH QUERY GENERATION AND USE IN A COMPUTER NETWORK ENVIRONMENT

BACKGROUND

In a computer networked environment such as the internet, entities such as people or companies provide information for public display on web pages or other online documents. The documents can include information provided by the entities via a computing device for display on the internet. Content can also be provided by third parties for display on the documents together with the information provided by the entities. Thus, a person viewing a document can access the information that is the subject of the document, as well as third party content that may or may not be related to the subject matter of the document.

SUMMARY

At least one aspect is directed to a computer implemented method of evaluating search query terms in a computer network environment. The method can obtain, by a data processing system having one or more processors, from a computing device via a computer network, a first search query having a first term and a second search query having a second term. The method can determine, by the data processing system, a relationship between the first search query and the second search query based on the first term and the second term, and can generate, by the data processing system, a structured search query representative of the first search query and the second search query. The structured search query can have at least one of a content identifier and a geographic location identifier based on at least one of the first term and the second term. The method can select, based on the structured search query, a content item for display by the computing device, and can receive, by the data processing system from the computing device via the computer network; an indication of a click on the content item. The method can provide, by the data processing system to a content publisher computing device via the computer network, a representation of the structured search query and the indication of the click on the content item, the representation of the structured search query indicating at least one of the content identifier and the geographic location identifier.

At least one aspect is directed to a system of evaluating search query terms in a computer network environment. The system can include a data processing system having one or more processors that can obtain, from a computing device via a computer network, a first search query having a first term, and obtain from the computing device via the computer network, a second search query having a second term. Any of the one or more processors can determine a relationship between the first search query and the second search query based on the first term and the second term, and can generate a structured search query representative of the first search query and the second search query. The structured search query can have at least one of a content identifier and a geographic location identifier based on at least one of the first term and the second term. Any of the one or more processors can select, based on the structured search query, a content item for display by the computing device, and can receive, from the computing device via the computer network, an indication of a click on the content item. Any of the one or more processors can provide, to a content publisher computing device via the computer network, a representation of the structured search query and the indication of the click on the content item. The representation of the structured search query can indicate at least one of the content identifier and the geographic location identifier.

At least one aspect is directed to a computer readable storage medium storing instructions that when executed by one or more data processors, cause the one or more data processors to perform operations. The operations can obtain, from a computing device via a computer network, a first search query having a first term, and can obtain, subsequent to obtaining the first search query, from the computing device via the computer network, a second search query having a second term. The operations can determine a relationship between the first search query and the second search query based on the first term and the second term, and can generate a structured search query representative of the first search query and the second search query. The structured search query can have at least one of a content identifier and a geographic location identifier based on at least one of the first term and the second term. The operations can select, based on the structured search query, a content item for display by the computing device, and can receive, from the computing device via the computer network; an indication of a click on the content item. The operations can provide, to a content publisher computing device via the computer network, a representation of the structured search query and the indication of the click on the content item. The representation of the structured search query can indicate at least one of the content identifier and the geographic location identifier.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
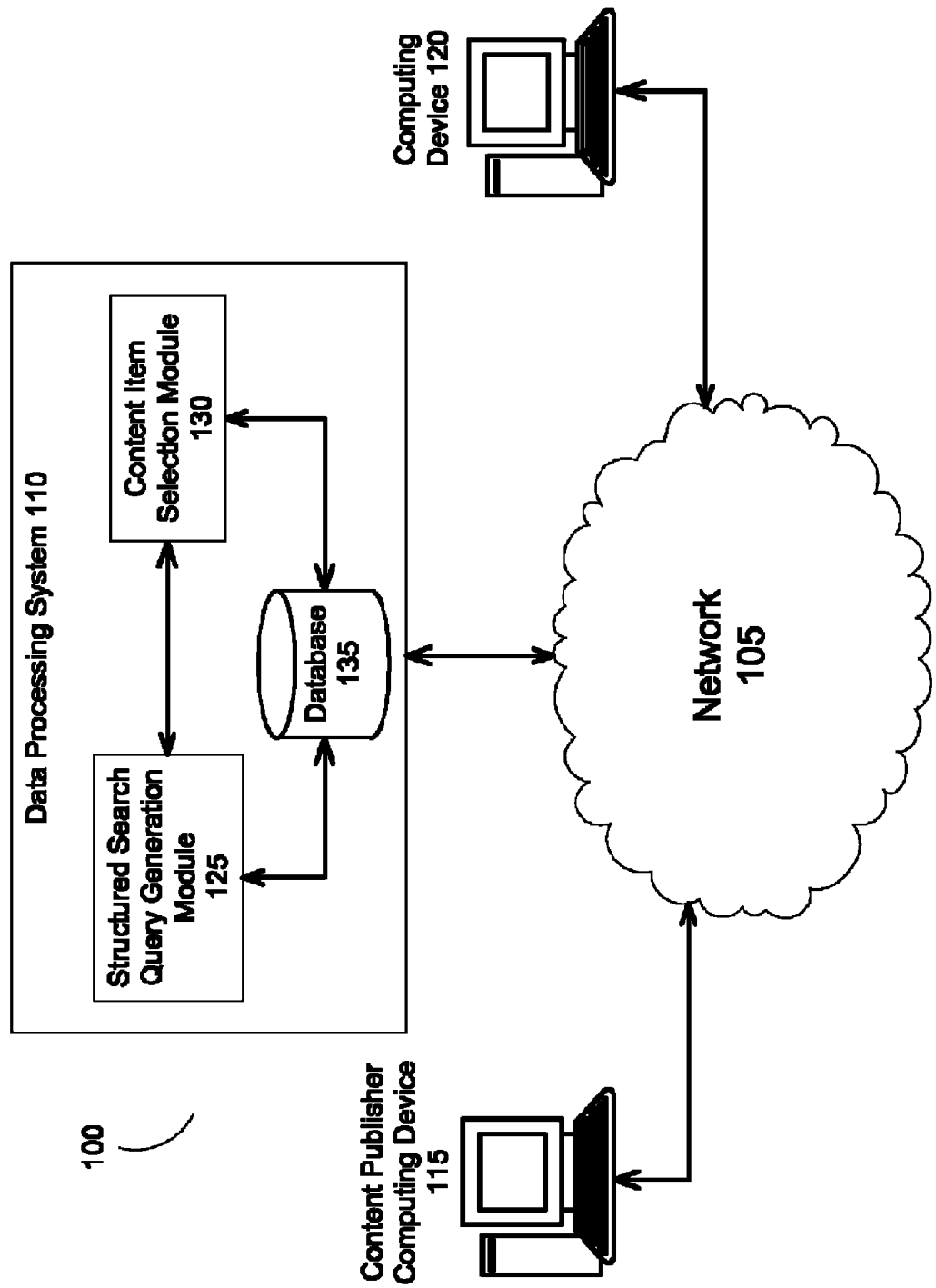
FIG. 1 is a block diagram depicting one example environment to evaluate search query terms, according to an illustrative implementation.

Following below are more detailed descriptions of various concepts related to, and implementations of, methods, apparatuses, and systems of evaluating online content search terms in a computer network environment. The various concepts introduced above and discussed in greater detail below may be implemented in any of numerous ways, as the described concepts are not limited to any particular manner of implementation.

Systems and methods of the present disclosure relate generally to creating and providing structured representations of an online search query. The structured representations of the search query can provide context to an indeterminate search query (e.g., one that lacks context), for example beyond what is indicated simply by search terms of a single search query. A representation of the structured search query can be provided to a content publisher computing device, associated for example with an advertiser. The advertiser can use this information to provide a more relevant (or a customized) online document for display by a computing device to a user, responsive to the search query.

For example, a search engine or other data processing system can receive, from a computing device such as a smartphone, a search query having the term "T-shirts" entered into an interface of the search engine via the smartphone. In response, the data processing system can provide content items (e.g., ads) related to T-shirts for display by the smartphone. In this example, the data processing system can receive a follow up search query simply having the search terms "small size". In this example, the search terms of second query by itself (e.g., "small size") lack context as they do not indicate that the user making the search query is in fact searching for small size T-shirts.

To facilitate ad or other content item placement responsive to the second search query, the data processing system receiving or obtaining the search queries can determine that they are related to each other. For example, the search queries can be semantically related, subject matter related, received from the same computing device, during the same computer network session, or received within a threshold time period of each other. Having determined that multiple search queries have a relation to each other, the data processing system can generate a structured search query based at least on the search terms of the multiple search queries. For example, the structured search query may be "type: shirt, style: tees, size: small." In this example, based on the two received search queries, the data processing system can create a structured search query that indicates a search for small size T-shirts.

The data processing system can provide this information, via a computer network, to a content publisher computing device associated with an advertiser. For example, a representation of the structured search query can be provided to the content publisher computing device with (e.g., as part of, appended to, or embedded within) a uniform resource identifier of a content item, responsive to a click of that content item by a computing device. In this example, the content publisher can receive and use the structured search query to provide relevant or custom content to the computing device that is the source of the first and second search queries. For example, a content publisher computing device of the content publisher can provide an online document (e.g., web page) having a focus on small size T-shirts, responsive to the structured search query, rather than a home page or other online document of the content publisher that may be less relevant to the structured search query, such as a web page having all small size items offered by the content publisher, e.g., small size shirts, pants, and sweaters, which may be responsive to the second query but not to the first query.

Thus, rather than provide or use search queries without context to identify content items or online documents responsive to those search queries, the systems and methods described herein can use, for example, search terms or other information related to a first search query in order to provide context to a second search query. The data processing system can indicate the context by creating a structured search query based on information from more than one search query, as well as other factors such as a time the search query was received or location of the search query. A representation of the structured search query can be provided to a content publisher computing device, for example with a uniform resource locator or other identifier. The content publisher computing device can use this information to provide more relevant content responsive to the search queries.

FIG. 1 illustrates an example system 100 for evaluating search query terms via at least one computer network, such as the network 105. The network 105 can include computer networks such as the internet, local, wide, metro or other area networks, intranets, satellite networks, other computer networks such as voice or data mobile phone communication networks, and combinations thereof. The network 105 can include or constitute a display network, e.g., a subset of information resources available on the internet that are associated with a content placement or search engine results system, or that are eligible to include third party content items as part of a content item placement campaign. The system 100 can also include at least one data processing system 110, e.g., at least one logic device such as a computing device or server having a processor to communicate via the network 105, for example with at least one content publisher computing device 115 or at least one computing device 120.

The data processing system 110 can include at least one server. For example, the data processing system 110 can include a plurality of servers located in at least one data center or server farm. In one implementation, the data processing system 110 includes a search engine that generates responses to search terms entered into an interface or input associated with the search engine via the network 105. The data processing system 110 can include at least one structured search query generation module 125, at least one content item selection module 130, and at least one database 135. The structured search query generation module 125 and the content item selection module 130 can each include at least one processing unit, server, virtual server, circuit, engine, agent, appliance, or other logic device such as programmable logic arrays configured to communicate with the database 135 and with other computing devices (e.g., the computing device 120 or the content publisher computing device 115) via the network 105.

The structured search query generation module 125 and the content item selection module 130 can include or execute at least one computer program or at least one script. The structured search query generation module 125 and the content item selection module 130 can be separate components, a single component, or part of the data processing system 110. The structured search query generation module 125 and the content item selection module 130 can include hardware, software, and combinations of software and hardware, such as one or more processors configured to execute one or more scripts to obtain or evaluate search queries, determine semantic, subject matter, or other relationships between two or more search queries, generate structures queries representative of two or more search queries, select content items for display responsive to search queries or to structured representations of search queries, receive indications of clicks or conversions of content items, and provide representations of structured queries to computing devices such as the content publisher computing device 115, for example.

The content publisher computing devices 115 can include personal computers, servers, mobile computing devices, or other computing devices operated by a content publishing entity to provide primary content, content items (e.g. ads), or other content linked to the content items for display by one or more computing devices 120 via the network 105. For example, the content publisher computing device 115 can include a web page (or other information resource) operator that provides primary content for display on the web page (or other information resource) via the network 105. The primary content can include content other than that provided by the content publisher computing device 115, and the information resource can include content slots configured for the display of third party content items (e.g., ads) from a third party. For example, the content publisher computing device 115 can operate the website of a company and can provide content about that company for display on web pages of the website. The web pages can include content slots configured for the display of third party content items such as ads. The content publisher computing device 115 can include, store, or be associated with content items or other online documents that can be displayed with, in, or responsive to a structured search query that can be generated by the data processing system 110 responsive to one or more search queries that the data processing system 110 receives from the computing device 120.

The computing devices 120 can include end user computing devices configured to communicate via the network 105 to display data such as the content provided by the content publisher computing device 115 (e.g., content items, primary web page content, or other information resources) as well as third party content items such as search engine result content items, or ads configured for display in a content slot of a web page. The computing device 120 and the content publisher computing device 115 can include desktop computers, laptop computers, tablet computers, smartphones, personal digital assistants, mobile devices, end user computing devices, consumer computing devices, servers, clients, and other computing devices. The computing device 120 and the content publisher computing device 115 can include user interfaces such as microphones, speakers, touchscreens, keyboards, pointing devices, a computer mouse, touchpad, or other input or output interfaces.

The data processing system 110 can include the structured search query generation module 125 or the content item selection module 130 as part of one or more servers of a search engine or content item placement system to evaluate search terms received from the computing device 120 via the network 105 and provide content items (e.g., ads) or online documents (e.g., web pages) responsive to the search terms, for display by the computing device 120 as search engine results.

The structured search query generation module 125 and the content item selection module 130 can be part of, or can include scripts executed by, one or more servers in the data processing system 110 (e.g., a search engine system or ads server system) to identify content items responsive to search terms, generate structured search queries based on search queries received from the computing devices 120, and provide representations of the structured search queries to content publisher computing devices 115. The structured search query generation module 125 can be part of the same or a different server as the content item selection module 130 in the data processing system 110. The structured search query generation module 125 can obtain search terms from search queries received via the network 105 from the computing device 120 and can generate a structured search query based on at least the search terms. The content item selection module 130 can identify or select content items responsive to the search queries, or to the structures search queries for display on a search engine lading page, for example. The data processing system 110 can include scripts executed remotely, e.g., by the computing device 120 or by the content publisher computing device 115. Such remotely executing scripts can still be considered part of the data processing system 110.

The system 100 can obtain at least one search query via the network 105. For example, the data processing system 110 can obtain or receive, via the network 105, multiple search queries, such as a first search query and a second search query from the computing device 120. The search queries can include one or more terms, one or more words, keywords, letters, numbers, audio entries, text determined from audio entries, or other phrases. The search queries can include voice queries spoken into an interface (e.g., microphone or audio input) of the computing device 120. For example, a user of the computing device 120 (e.g., a smartphone) can enter one or more search queries into an interface of a search engine online document displayed by the computing device 120. The data processing system 110 can receive the search queries and identify search terms of the search queries. The search terms may but need not be a complete phrases, sentences, inquiries, or question. The search terms can be provided from the computing device 120 to the data processing system 110 via a transmission through the computer network 105. The search terms can be received by the structured search query generation module 125, the content items selection module 130, or other component of the data processing system 110 (e.g., a server associated with a search engine).

In one implementation, the data processing system 110 obtains, from the computing device 120 via the network 105, a first search query having at least a first term, and a second search query having at least a second term. The first and second (or any other number of) search queries can be made by the same computing device 120. The search queries can also be made by different computing devices 120. The data processing system 110 can receive or otherwise obtain the first and second search terms sequentially. For example, the data processing system 110 can receive the first search query, and can subsequently receive the second search query. Intervening events can occur between a time the first search query is obtained and a (e.g., subsequent) time that the second search query is obtained. For example, the data processing system 110 (or other search engine system) can provide search results for display by the computing device 120, responsive to the first search query, prior to entry of the second search query into a search engine or other interface of the computing device 120. The intervening search results can include ads or other content items. The search results displayed by the computing device 120 can be associated with the structured search query. For example a uniform resource locator or other identifier associated with displayed content items (e.g., search results) can include or indicate a representation of the structured search query.

The data processing system 110 can determine (e.g., identify) a relationship between the first search query and the second search query. The relationship between search queries can be based on semantic, subject matter, temporal, content, or other similarities between the search queries or their search terms. For example, the data processing system 110 can determine that the second search query is responsive to, related to, or an elaboration or refinement of search engine results provided to the computing device 120 responsive to a first search query received from that computing device 120. The second search query can have different search terms than the first search query, derivative search terms, partially overlapping search terms, or can share some search terms in common with the first search query. In one example, the data processing system 110 can determine that a second search query obtained by the data processing system 110 from the computing device 120 within a threshold time period, (e.g., a few minutes, hours, or days) of a first search query made by that same computing device 120 is related to the first search query.

The data processing system 110 can detect a relationship based on subject matter similarity between the first and second (or any other number of) search queries. For example, the data processing system 110 can determine that a first search query having the search terms "honeymoon vacation" is related to a second search query having the search terms "tropical beach" or "bed and breakfast". In this example, the data processing system 110 can determine that the search terms of these search queries have subject matter similarity, e.g., they relate to luxury or exotic holidays. Relations between search queries can also be determined based on semantic similarities between search queries. For example, search terms of a multiple search queries can be abbreviations, expansions, derivatives, synonyms, or roots of each other.

The data processing system 110 can generate a structured search query. For example, the structured search query generation module 125 or other data processing system 110 component can create a structured search query based on more than one search query received from the computing device 120. The structured search query can add context, e.g., from a first search query, to a related second search query where, for example, the search terms of the second search query may lack context.

The structure of the structured search query, for example, can include content identifiers, geographic location identifiers, or other subject matter, time, place, or context identifiers. For example, the first search query received from the computing device 120 can include the term "T-shirts" and the second, e.g., subsequent search query can include the search terms "small size". Having determined that the first and second search query are related, for example due to subject matter similarities between the search queries or because the second search query was provided responsive to search results of the first search query, the data processing system 110 can create the structured search query "type: shirt, style: tees, size: small." This example structured search query includes content identifiers "type", "style", and "size" that provide context to the search queries. For example, without the structured search query, the content publisher computing device 120 or the data processing system 110 may lack context to provide an accurate response to the second search query that simply states "small size" without directly indicating the context of this search query.

In another example, the data processing system 110 can obtain a first search query of "flights from San Francisco to Hawaii" and a second search query of "book flight". In this example, the data processing system 110 can determine that the search queries are related, e.g., as they both relate to subject matter involving air travel, and can create a structured search query that is representative of both search queries. For example, the structured search query generation module 125 can create the structured search query "departure location: San Francisco, arrival location: Hawaii, action: book flight". In this example, the second search query lacks context regarding which flight or type of flight to book. The data processing system 110 can apply the context from the first query to the subject matter of the second query, based at least in part on the search terms of those queries, to create the structured search query. In this example the structured search query includes geographic location identifiers that identify the geographic locations San Francisco and Hawaii, and the content identifier indicating that action of making an airline ticket reservation.

Based on the structured search query, the data processing system 110 or component thereof such as the content item selection module 130 can identify or otherwise select at least one content item such as an ad to provide for display by the computing device 120 via the network 105. For example the content item selection module 130 or other data processing system 110 component can evaluate a data structure (e.g., stored in the database 135 or another database), where the data structure includes information representative of content items, to identify or select a content item that can be provided for display by the computing device 120. The content item can be responsive to the structured search query. For example, the content item can be an ad or other online document for small size T-shirts, or for discount flights to or hotels in Hawaii. In some instances, a user of the computing device 120 can instruct the computing device 120 to click or otherwise access the content item. Via the network 105, the data processing system 110 can receive an indication of a click (or other conversion) of the content item. For example, the content item can be an ad by a content publisher (e.g. advertiser) for Hawaiian vacations. The click can indicate an attempt or request by the computing device 120 to access content associated with the content item, such as an online document of the content publisher, operated by the content publisher computing device 115.

The data processor 110 can provide the structured search query to the content publisher computing device 115 via the network 105. The content publisher computing device 115 can use the context information contained in the structured representation of the search query to identify online documents (e.g., web pages, ads, apps) or other information resources to provide for display by the computing device 120, responsive to the click by the computing device 120 of a content item.

In some implementations, the data processing system 110 provides a representation of the structured search query to the content publisher computing device 115. For example, the representation of the structured search query can include an abbreviated, encoded, truncated, condensed, or partial version of the structured search query. The content publisher computing device 115 can expand, decode, or restore the full structured search query to access information indicated by the structured search query. This information, for example as indicated by the content identifier, the geographic location identifier, or other data, can be used to direct the computing device 120, responsive to the click, to select online content associated with the content publisher computing device 115. This selected online content may be more relevant to the first or second search queries that originated with the computing device 120 than content selected without the benefit of the context provided by the structured search query.

The data processing system 110 can provide the search query, e.g., as a structured representation of the search query, to the content publisher computing device 115 together with a uniform resource identifier (or other uniform resource locator). For example, responsive to the click, which indicates an attempt by the computing device 120 to access online content associated with the content item, the data processing system 110 can embed, attach, append, associate, or integrate a representation of the structured search query into the uniform resource identifier associated with the content item. The content publishing computing device 115 can parse or otherwise evaluate the uniform resource identifier to determine context of one or more search queries made by the computing device 120. The content publishing computing device 115 cause this information, obtained from the representation of the structured search query received with the uniform resource identifier, to identify content to provide for display by the computing device 120 responsive to the click on the content item. In some implementations, the content item provided for display by the computing device 120 already includes or is associated with the structured search query (or a representation thereof). For example, content items displayed by the computing device 120 on a search engine results landing page can include a representation of the structured search query, e.g., associated with a uniform resource identifier of the content items.

The data processing system 110 can generate the structured representation of the search query based on supplemental terms. The supplemental terms can include time, device type, or other data that is absent from (e.g., not indicated by) the search queries or the search terms of the search queries. The data processing system 110 can identify the supplemental terms and generate the structured search query based on the supplemental term or terms. The structured search query (or representation thereof) provided to the content publisher computing device 115 can include the supplemental term, or a representation indicating the supplemental term. The supplemental term, for example, can include characteristics of the computing device 120, time criteria, subject criteria, or object criteria that can be used by the content publisher computing device 115 to identify online documents or other content to provide for display by the computing device 120, via the network 105.

The data processing system 110 can generate a first structured search query representative of at least one search term of a first search query, and of at least one supplemental term absent from the first search query. A content item associated with the content publisher computing device 115 can be selected based on this first structured search query for display by the computing device 120, responsive to the first structured search query. The data processing system 110 can receive an indication of a click on the content item displayed by the computing device 120. Responsive to the received indication of the click, the data processing system 110 can provide a representation of the structured query and the indication of the click to the content publisher computing device, associated for example with a uniform resource locator. In some examples, subsequent or responsive to display of the content item by the computing device 120, the data processing system 110 can receive a second search query.

Figure 2:
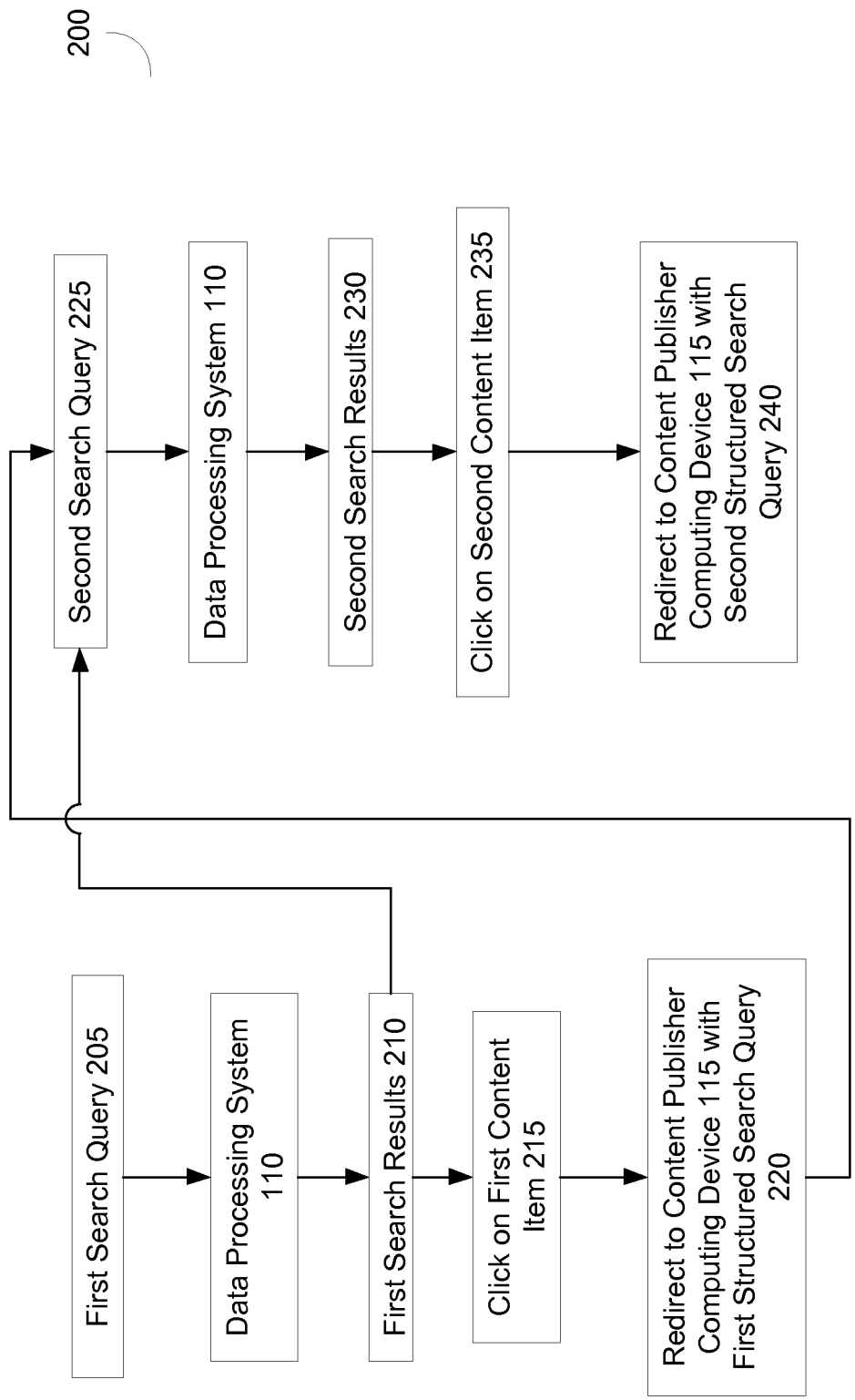
FIG. 2 is a chart depicting one example of search query evaluation using structured search queries, according to an illustrative implementation.

The data processing system 110 can provide structured search queries to content publisher computing devices 115 in an iterative manner. For example, FIG. 2 depicts an example implementation 200 of search query evaluation using structured search queries. The data processing system 110 can receive the first search query 205 from the computing device 120 and provide first search results 210 responsive to the first search query 205. The first search results 210 can be provided for display by the computing device 120 that is the source of the first search query 205.

The data processing system 110 can obtain an indication of a first click 215 on the first content item, indicating that the computing device 120 requests access to the content item associated with a content publisher computing device 115. The data processing system 110 can redirect or indicate the click on the content item together with a first structured search query 220 associated with the first search query 205. The data processing system 110 can also receive a second search query 225, for example subsequent to the first search query from the same or different computing device 120, and can provide second search results 230 (e.g., content items) responsive to at least the second search query 225. The second search results 230 can also be responsive to the first structured search query 220. The data processing system 110 can obtain an indication of a second click 235 on one or more of the second search results 230, and can provide an indication 240 of the second click 235 to the content publisher computing device 115 together with the second structured search query. In this example, the first structured search query can be based on the first search query 205, and the second structured query can be based on the first search query 205 and the second search query 210. The first and second structured query can also indicate supplemental terms absent from the first and second search queries.

In some implementations, the user can directly make a second query subsequent to the first query, without clicking any search results of the first query, proceeding directly from first search results 210 to second search query 225. For example, a user can view the first search results 210 and make an audio (or other) second search query 225 in response, without clicking or accessing content associated with the first search results 210.

Figure 3:
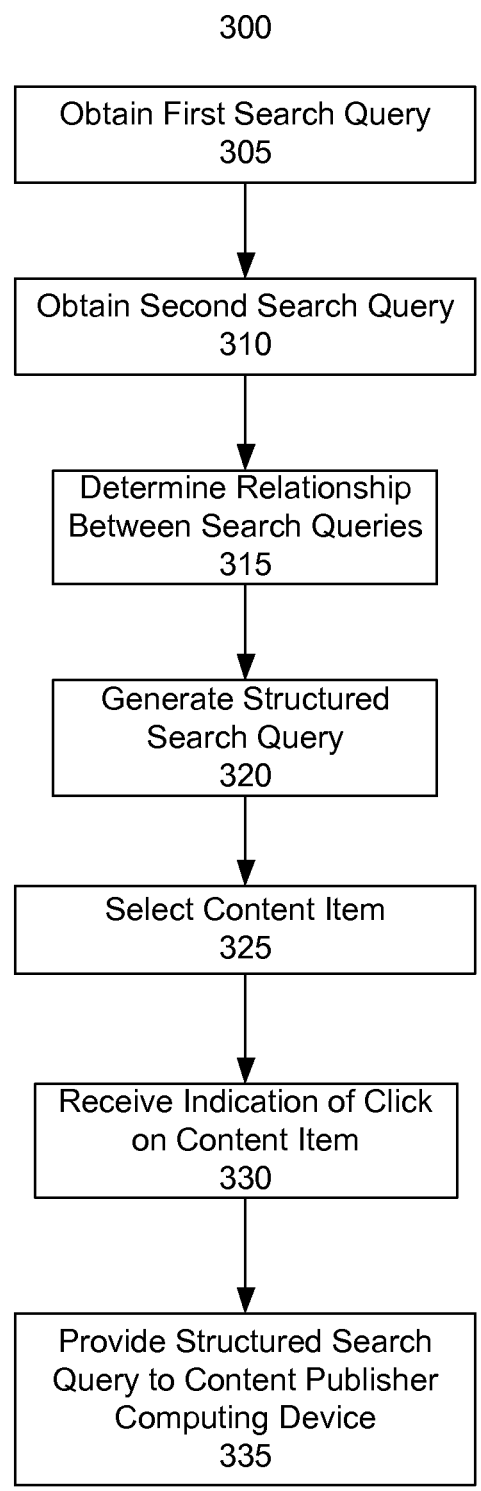
FIG. 3 is a flow diagram depicting an example method of evaluating search query terms, according to an illustrative implementation.

FIG. 3 is a flow diagram depicting an example method 300 of evaluating search query terms. The method 300 obtains search queries (ACTS 305, 310). For example, the data processing system 110 can obtain search queries (ACTS 305, 310) from the computing device 120 via the network 105. The obtained search queries can include search terms. In some implementations, the data processing system obtains a first search query (ACT 305) from a computing device 120 and, subsequently, obtains a second search query (ACT 310) from the same computing device 120. The second search query can be responsive to or independent from search results of the first search query.

The method 300 can determine at least one relationship between multiple search queries (ACT 315). For example, the data processing system 110 can determine a relationship between a first search query and a second search query based on semantic or subject matter similarities between search terms of the search queries, or other factors such as times when the search queries are made by the computing device 120 or received by the data processing system 110. The method 300 can generate a structured search query representative of at least one obtained search query (ACT 320). For example, the data processing system 110 can generate a structured search query (ACT 320) representative of first and second search queries, or other factors such as supplemental terms. The generated structured search query can include content identifiers or geographic location identifiers based on search terms of the search query.

The method 300 can select content items (ACT 325). For example, based on the structured query, the data processing system 110, which may include or be part of a larger data processing system associated with an online content item placement campaign, can select at least one content item for display by the computing device 120 (ACT 325). The selected content item can be responsive to the structured search query. The method can receive an indication of a click on the content item (ACT 330). For example, the data processing system 110 can receive an indication that the computing device 120 requests access to an online document or other information resource associated with the content item displayed by the computing device 120. The click can include a scrollover, mouse over, conversion, or other interaction with the content item.

The method 300 can provide the structured search query to the content provider computing device 115 (ACT 335). For example, the data processing system 110 can provide the structured search query (e.g., as a condensed or truncated representation) to the content publisher computing device 115 with a uniform resource identifier via the network 105 (ACT 335). The structured search query or representation thereof can be associated with, or provided to the content publisher computing device 115 with, an indication or identification of the content item that was clicked (e.g., actuated, converted, or accessed) by the computing device 120. The structured query can indicate content, geographic, or other identifiers associated with the search queries obtained from the computing device 120.

The structured search query can be shared by the data processing system 110 with advertisers associated with the content publisher computing devices 115 to select content items responsive to the original search queries obtained by the data processing system 110 from the computing device 120. The advertiser or other content publisher associated with the content publisher computing device can use the structured search query to deep link the computing device 120 directly to an information resource (e.g., app, web page, or other online document) responsive to the structured search query.

Figure 4:
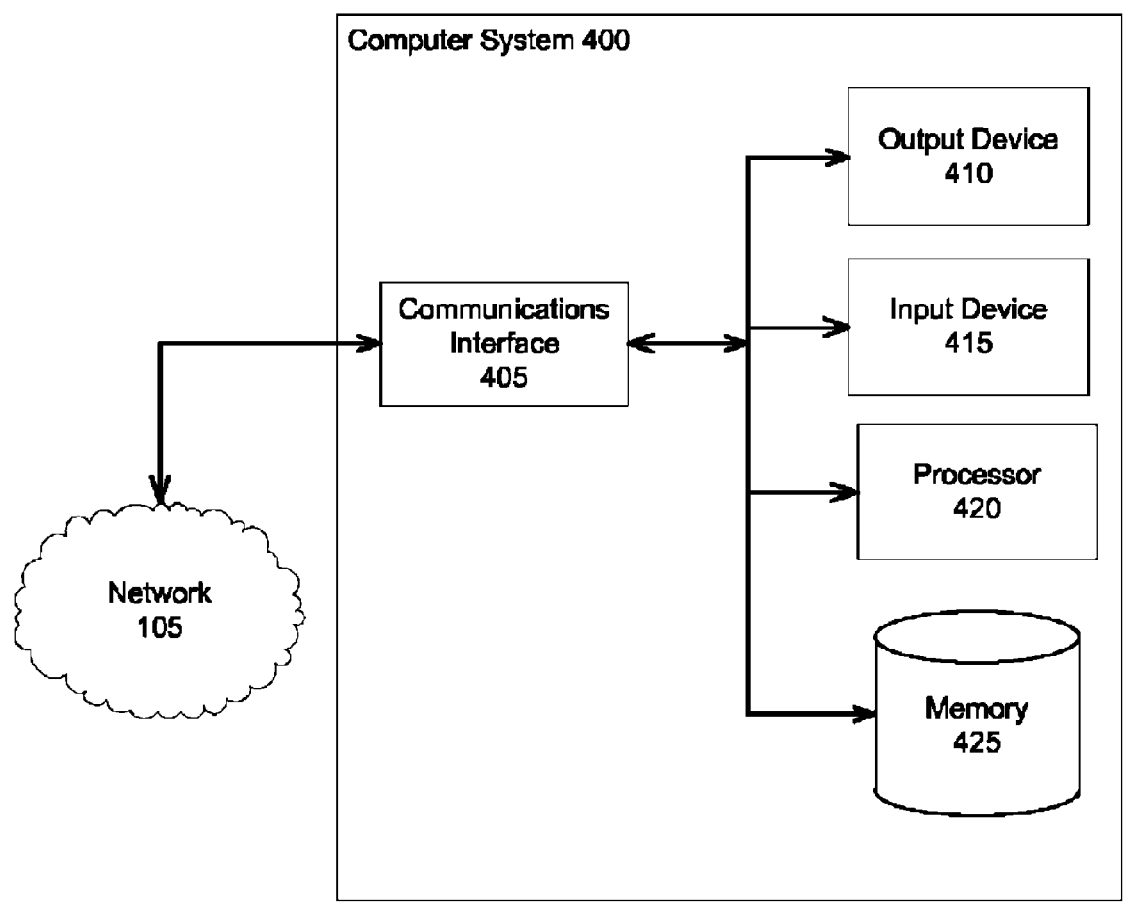
FIG. 4 is a block diagram illustrating a general architecture for a computer system that may be employed to implement elements of the systems and methods described and illustrated herein, according to an illustrative implementation.

FIG. 4 shows the general architecture of an illustrative computer system 400 that may be employed to implement any of the computer systems discussed herein (including the system 100 and its components such as the data processing system 110, structured search query generation module 125 and the content item selection module 130) in accordance with some implementations. The computer system 400 can be used to provide information via the network 105, for example to generate structured search queries that include information from two or more search queries (or supplemental information), or to provide a representation of the structured search queries to the content publisher computing device 115. The computer system 400 includes one or more processors 420 communicatively coupled to at least one memory 425, one or more communications interfaces 405, one or more output devices 410 (e.g., one or more display units) or one or more input devices 415. The processors 420 can be included in the data processing system 110 or the other components of the system 100 such as the structured search query generation module 125 and the content item selection module 130.

The memory 425 can include computer-readable storage media, and can store computer instructions such as processor-executable instructions for implementing the operations described herein. The structured search query generation module 125, the content item selection module 130, or the database 135 can include the memory 425 to store the search queries, terms of search queries, structured search queries, and representations of the structured search queries, as well as content items or information about content items, for example. The at least one processor 420 can execute instructions stored in the memory 425 and can read from or write to the memory information processed and or generated pursuant to execution of the instructions.

The processors 420 can be communicatively coupled to or control the at least one communications interface 405 to transmit or receive information pursuant to execution of instructions. For example, the communications interface 405 can be coupled to a wired or wireless network, bus, or other communication means and can allow the computer system 400 to transmit information to or receive information from other devices (e.g., other computer systems). One or more communications interfaces 405 can facilitate information flow between the components of the system 100. In some implementations, the communications interface 405 can (e.g., via hardware components or software components) to provide a website as an access portal to at least some aspects of the computer system 400. Examples of communications interfaces 405 include user interfaces.

The output devices 410 can allow information to be viewed or perceived in connection with execution of the instructions. The input devices 415 can allow a user to make manual adjustments, make selections, enter data or other information, or interact in any of a variety of manners with the processor during execution of the instructions.

The subject matter and the operations described herein can be implemented in digital electronic circuitry, or in computer software, firmware, or hardware, including the structures disclosed herein and their structural equivalents, or in combinations of one or more of them. The subject matter described herein can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing system or apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The term "data processing system" or "computing device" "module" "engine" or "component" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The structured search query generation module 125 and the content item selection module 130 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server (e.g., received by the data processing system 110 from the computing device 120 or the content publisher computing device 115).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the structured search query generation module 125 and the content item selection module 130 can be a single module, a logic device having one or more processing circuits, or part of one or more servers of the data processing system 110.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. For example, the structured search query can include information from any number of search queries from the same computing device 120 or from different computing devices 120, such as multiple computing devices 120 associated with a common account for an online activity. The structured search query can include additional content, e.g., supplemental terms independent of the search query. The structured search query can also be based on a single search query, and may include supplemental terms. Scope of the systems and methods described herein is thus indicated by the appended claims, rather than the foregoing description, and changes that come within the meaning and range of equivalency of the claims are embraced therein.

What is claimed is:

1. A computer implemented method of evaluating search query terms in a computer network environment, comprising:
   obtaining, by a data processing system having one or more processors, from a computing device via a computer network, a first search query having a first term and a second search query having a second term;
   determining, by the data processing system, a relationship between the first search query and the second search query based on the first term and the second term;
   generating, by the data processing system, a structured search query representative of the first search query and the second search query, the structured search query having at least one of a content identifier and a geographic location identifier, and the structured search query based on both the first term and the second term;
   selecting, based on the structured search query, a content item;
   receiving, by the data processing system from the computing device via the computer network; an indication of a click on the content item; and
   providing, by the data processing system to a content publisher computing device via the computer network, responsive to the click on the content item, a representation of the structured search query and the indication of the click on the content item, the representation of the structured search query embedded within a uniform resource identifier associated with the content item, the representation of the structured query based on both the first term and the second term, and indicating at least one of the content identifier and the geographic location identifier.

2. The method of claim 1, comprising:
   providing the content item for display by the computing device with the representation of the structured search query included in the uniform resource identifier associated with the content item.

3. The method of claim 1, comprising:
   identifying, by the data processing system, a supplemental term absent from the first search query and absent from the second search query;
   generating the structured search query based on the supplemental term; and
   providing, by the data processing system to the content publisher computing device, the representation of the structured search query with an indication of the supplemental term.

4. The method of claim 3, wherein the supplemental term includes at least one of a characteristic of the computing device, a time criterion, a subject criterion, and an object criterion.

5. The method of claim 1, wherein the content item is a first content item, comprising:
   generating, by the data processing system, a first structured search query representative of the first search query and representative of a supplemental term absent from the first search query, prior to obtaining the second search query;
   providing, based on the first structured search query, a second content item for display by the computing device prior to obtaining the second search query;
   receiving, by the data processing system from the computing device via the computer network; an indication of a click on the second content item; and
   providing, by the data processing system, a representation of the first structured search query and the indication of the click on the second content item to a content publisher computing device associated with the second content item.

6. The method of claim 1, comprising:
   determining, by the data processing system, the relationship between the first search query and the second search query based on at least one of a semantic similarity and a subject matter similarity between the first term and the second term.

7. The method of claim 1, comprising:
   evaluating, by the one or more processors, a data structure having information representative of a plurality of content items to select the content item for display by the computing device.

8. The method of claim 1, wherein the first search query includes a first voice query and the second search query includes a second voice query.

9. The method of claim 1, wherein the representation of the structured query includes at least one of an abbreviated, an encoded, a truncated, a condensed, and a partial version of the structured search query.

10. A system of evaluating search query terms in a computer network environment, comprising:
    a data processing system having one or more processors configured to:
    obtain, from a computing device via a computer network, a first search query having a first term;
    obtain from the computing device via the computer network, a second search query having a second term;
    determine a relationship between the first search query and the second search query based on the first term and the second term;

generate a structured search query representative of the first search query and the second search query, the structured search query having at least one of a content identifier and a geographic location identifier, and the structured search query based on both the first term and the second term;

select, based on the structured search query, a content item for display by the computing device;

receive, from the computing device via the computer network, an indication of a click on the content item; and provide, to a content publisher computing device via the computer network, responsive to the click on the content item, a representation of the structured search query and the indication of the click on the content item, the representation of the structured search query appended to a uniform resource identifier associated with the content item, the representation of the structured query based on both the first term and the second term, and indicating at least one of the content identifier and the geographic location identifier.

11. The system of claim 10, comprising:

the data processing system configured to provide, responsive to the click on the content item, the representation of the structured search query to the content publisher computing device with a uniform resource identifier.

12. The system of claim 10, comprising the data processing system configured to:

identify a supplemental term absent from the first search query and absent from the second search query;

generate the structured search query based on the supplemental term; and provide the representation of the structured search query with an indication of the supplemental term.

13. The system of claim 12, wherein the supplemental term includes at least one of a characteristic of the computing device, a time criterion, a subject criterion, and an object criterion.

14. The system of claim 10, wherein the content item is a first content item, comprising the data processing system configured to:

generate a first structured search query representative of the first search query and representative of a supplemental term absent from the first search query;

provide, based on the first structured search query, a second content item for display by the computing device prior to obtaining the second search query;

receive, from the computing device via the computer network; an indication of a click on the second content item; and provide a representation of the first structured search query and the indication of the click on the second content item to a content publisher computing device associated with the second content item.

15. The system of claim 10, comprising:

the data processing system configured to determine the relationship between the first search query and the second search query based on at least one of a semantic similarity and a subject matter similarity between the first term and the second term.

16. The system of claim 10, wherein the representation of the structured query includes at least one of an abbreviated, an encoded, a truncated, a condensed, and a partial version of the structured search query.

17. A computer readable storage medium storing instructions that when executed by one or more data processors, cause the one or more data processors to perform operations comprising:

obtaining, from a computing device via a computer network, a first search query having a first term;

obtaining, subsequent to obtaining the first search query, from the computing device via the computer network, a second search query having a second term;

determining a relationship between the first search query and the second search query based on the first term and the second term;

generating a structured search query representative of the first search query and the second search query, the structured search query having at least one of a content identifier and a geographic location identifier, and the structured search query based on both the first term and the second term;

selecting, based on the structured search query, a content item for display by the computing device;

receiving, from the computing device via the computer network; an indication of a click on the content item; and providing, to a content publisher computing device via the computer network, responsive to the click on the content item, a representation of the structured search query and the indication of the click on the content item, the representation of the structured search query embedded within a uniform resource identifier associated with the content item, the representation of the structured query based on both the first term and the second term, and indicating at least one of the content identifier and the geographic location identifier.

18. The computer readable storage medium of claim 17 storing instructions that when executed by the one or more data processors, cause the one or more data processors to perform operations comprising:

evaluating a data structure having information representative of a plurality of content items to select the content item for display by the computing device.

19. The computer readable storage medium of claim 17 storing instructions that when executed by the one or more data processors, cause the one or more data processors to perform operations comprising:

providing the content item for display by the computing device with the representation of the structured search query included in the uniform resource identifier associated with the content item.

20. The computer readable storage medium of claim 17 storing instructions that when executed by the one or more data processors, cause the one or more data processors to perform operations comprising:

generating a first structured search query representative of the first search query and representative of a supplemental term absent from the first search query, prior to obtaining the second search query;

providing, based on the first structured search query, a second content item for display by the computing device prior to obtaining the second search query;

receiving, from the computing device via the computer network; an indication of a click on the second content item; and providing a representation of the first structured search query and the indication of the click on the second content item to a content publisher computing device associated with the second content item.

\* \* \* \* \*